United States Patent
Heil

(10) Patent No.: US 7,308,016 B2
(45) Date of Patent: Dec. 11, 2007

(54) SYSTEM AND METHOD FOR SECURING SIGNALS

(75) Inventor: Robert H. Heil, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 839 days.

(21) Appl. No.: 10/733,975

(22) Filed: Dec. 11, 2003

(65) Prior Publication Data

US 2004/0230824 A1 Nov. 18, 2004

(51) Int. Cl.
*H04B 1/00* (2006.01)

(52) U.S. Cl. ............... 375/130; 375/142; 375/150; 380/255

(58) Field of Classification Search ............... 375/130, 375/140, 141–144, 146–152; 380/255, 268, 380/42, 287
See application file for complete search history.

(56) References Cited

U.S. PATENT DOCUMENTS 6,069,915 A * 5/2000 Hulbert .................. 375/150
6,169,887 B1 * 1/2001 Cordell et al. ............ 455/242.2
6,625,202 B1 * 9/2003 Sudo et al. ................ 375/147
6,628,675 B1 * 9/2003 Neufeld .................... 370/503
6,738,412 B1 * 5/2004 Hayakawa ................. 375/130
6,980,803 B2 * 12/2005 Johansson ................. 455/438
6,999,719 B2 * 2/2006 Han .......................... 455/10
2003/0095588 A1 * 5/2003 Yellin et al. ............... 375/147

* cited by examiner

*Primary Examiner*—Jean B. Corrielus
(74) *Attorney, Agent, or Firm*—Leonard A. Alkov

(57) ABSTRACT

A system for inhibiting a potential interference source in a communications system. The system includes a first mechanism for incorporating a code within a signal. A second mechanism employs the code to decode the signal. A third mechanism for selectively prevents detection by the second mechanism of a subsequent signal employing the code. In a specific embodiment, the third mechanism incorporates a predetermined delay after receipt of the signal by the second mechanism. The predetermined delay is sufficient to prevent detection by the second mechanism of the subsequent signal employing the code. The code is a function of a time value associated with the signal. The subsequent signal incorporates the code and lacks a corresponding accurate time value due to the predetermined delay. Consequently, rebroadcast of the subsequent signal, which is a delayed signal, is less likely to interfere with the system communications.

11 Claims, 3 Drawing Sheets

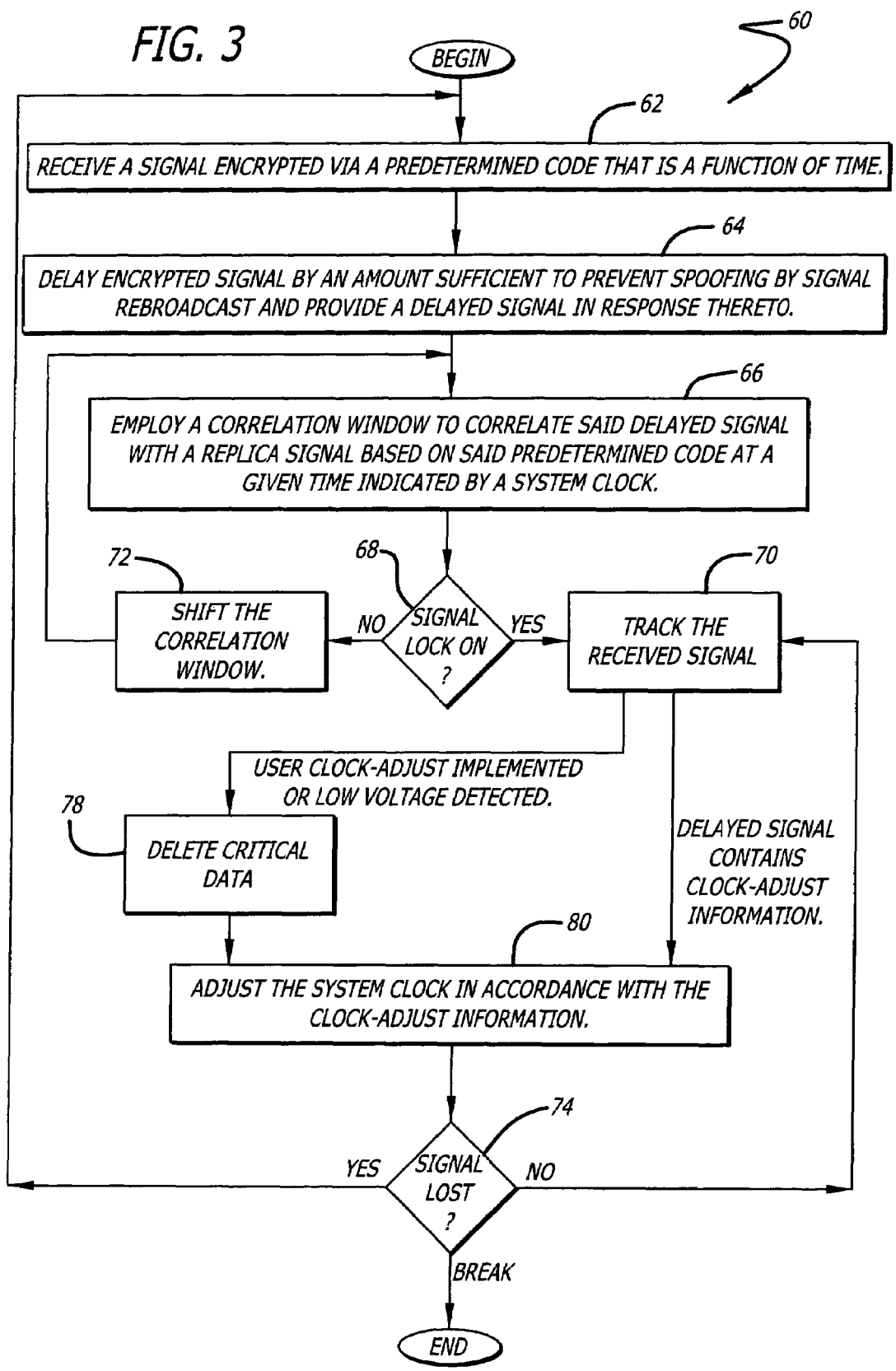

SYSTEM AND METHOD FOR SECURING SIGNALS

BACKGROUND OF THE INVENTION

1. Field of Invention

This invention relates to data security. Specifically, the present invention relates to systems and methods for preventing the mis-authentication of signals or data.

2. Description of the Related Art

Signal authentication systems are employed in various demanding applications including cellular telephony, wireless communications, e-commerce transactions, and GPS navigation. Such applications demand efficient and cost-effective authentication systems that impose minimal design and operational constraints on accompanying communications systems.

To facilitate signal authentication, spread spectrum communications systems are often employed. In a conventional spread spectrum system, signals are encoded and spread over a predetermined bandwidth via a pseudo random spreading sequence, also called a Pseudo-Noise (PN) sequence. A receiver often employs a copy of the spreading sequence to coherently detect, decode, and authenticate received spread spectrum signals. The de-spreading sequence used by the receiver represents an internal copy of the broadcast waveform. Unfortunately, the de-spreading sequence used by a receiver may be indistinguishable from the desired signal and thus may be detected by, or may interfere with, other receivers also searching for the original signals.

Signal authentication systems are particularly important in applications where jamming or spoofing is problematic. To prevent misuse of the de-spreading sequence, anti-tamper devices may be employed. However, conventional anti-tamper devices are often readily circumvented. Furthermore, enclosing all signal-processing components and activities within a tamper-resistant container places undesirable design constraints on associated receiver and transmitter systems. The design constraints may increase system size, complexity, and cost. Furthermore, conventional tamper-resistant containers often complicate or inhibit system upgrades.

GPS systems transmit navigation signals using a spread-spectrum modulation scheme. GPS signals are encoded with a PN sequence. The encoded (spread) signals are transmitted from satellites to receivers, such as GPS navigation receivers. The GPS receivers can time signals received from different satellites with known positions to determine the current position of the receiver. Ideally, only receivers that can generate the PN sequence corresponding to the transmitted signal can decode and use the signal broadcast from the satellite.

To jam a GPS satellite signal, a GPS jammer may broadcast false. GPS signals. To overcome GPS jamming, various well-known signal authentication methods may be employed to distinguish between jamming signals and authentic signals. Unfortunately, conventional authentication systems may require lengthy GPS signal tracking. The significant signal tracking time required for authentication may delay valid GPS navigation signal acquisition and use.

Hence, a need exists in the art for an efficient system and method for enabling robust signal authentication while facilitating system upgrades. There exists a further need for a communications system incorporating an efficient authentication system that inhibits jamming and that may reduce communications system noise.

SUMMARY OF THE INVENTION

The need in the art is addressed by the system for securing signals in a communications system of the present invention. In the illustrative embodiment, the inventive system is adapted for use with GPS systems. The system includes a first mechanism for incorporating a code within a signal. A second mechanism employs the code to decode the signal. A third mechanism selectively prevents detection by the second mechanism of a subsequent signal employing the code.

In a specific embodiment, the third mechanism incorporates a predetermined delay after receipt of the signal by the second mechanism. The predetermined delay is sufficient to prevent detection by the second mechanism of the subsequent signal employing the code. The code is a function of a time value associated with the signal. The subsequent signal incorporates the code and lacks a corresponding accurate time value due to the predetermined delay. The delay disables detection of the subsequent signal via the second mechanism. The second mechanism further includes a receiver having a delay buffer that is sufficient to add the predetermined delay to the signal before detection by the second mechanism. The receiver further includes a correlator that employs the code to detect the signal.

In the specific embodiment, the predetermined delay is longer than a search window employed by the correlator. The receiver incorporates a clock whose time is selectively adjustable via a received signal and not user-adjustable via the receiver. The receiver further includes a mechanism for receiving a time value from the clock, incorporating a user-adjustable modification thereto, and outputting an adjusted time value in response thereto. In an illustrative embodiment, the receiver incorporates a clock whose time is selectively adjustable via a received encrypted signal and user-adjustable only if critical elements of the code generator used to despread the received signal are reset or erased. These critical elements may include algorithms, initialization data, authentication data, signature data, encryption codes, or other essential elements of the code generation scheme.

The novel design of the system is facilitated by the second mechanism, which implements a delay longer than the search window of the receiver. The delay sufficiently postpones generation of a local replica signal to thwart negative effects, such as interference or jamming, that might be caused by timely rebroadcast of the replica signal.

BRIEF DESCRIPTION OF THE DRAWINGS

FIG. 3 is a flow diagram of a method adapted for use with the communications system of FIG. 1.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
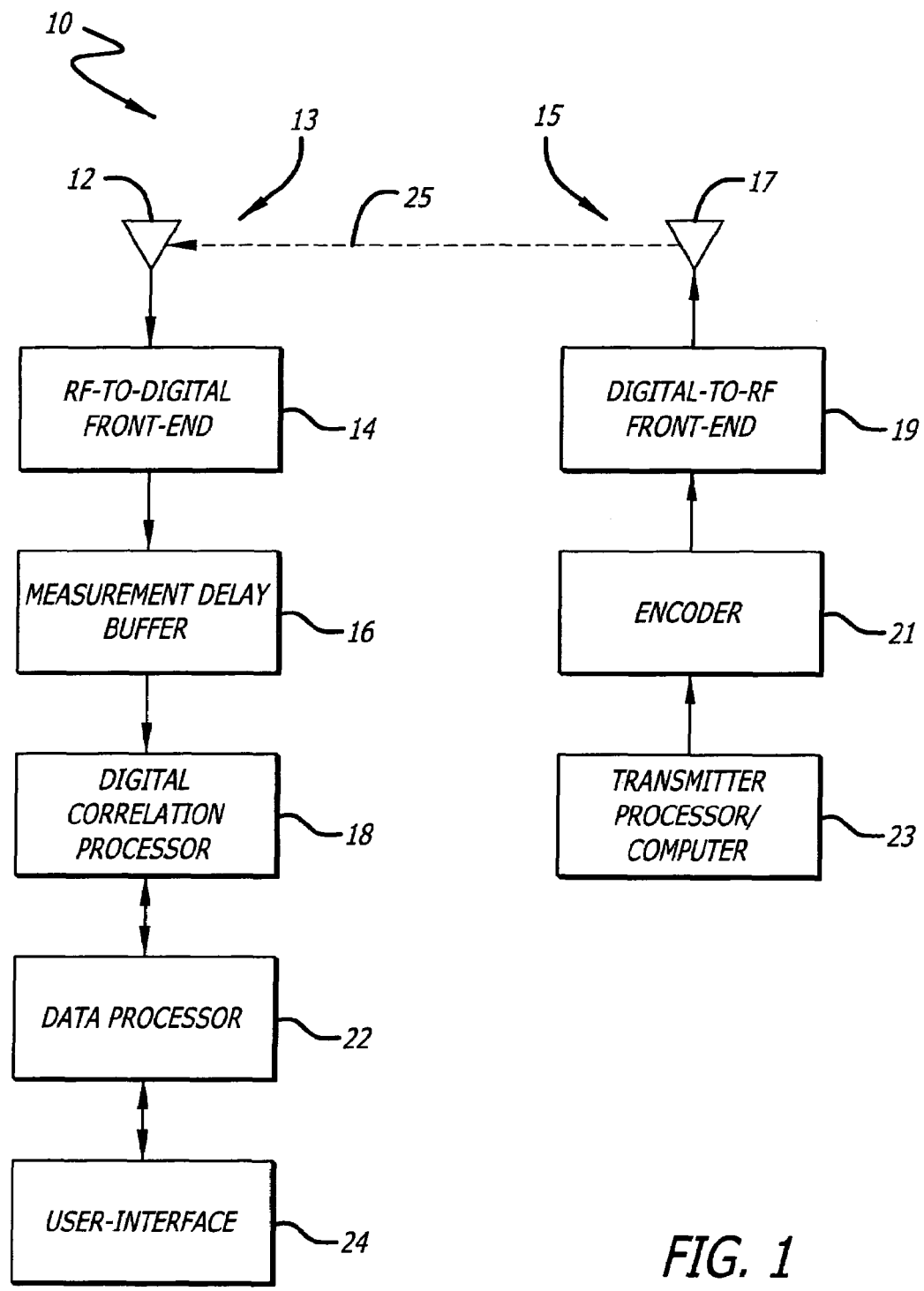
FIG. 1 is a diagram of a communications system constructed in accordance with the teachings of the present invention employing a receiver with a signal authentication system having a unique measurement delay buffer.

FIG. 1 is a diagram of a communications system 10 constructed in accordance with the teachings of the present invention employing a receiver 13 having a unique measurement delay buffer 16. For clarity, various features, such as amplifiers, downconverters, duplexers, and so on, have been omitted from the figures. However, those skilled in the art with access to the present teachings will know which components and features to implement and how to implement them to meet the needs of a given application.

The receiver 13 includes, from top to bottom, a receiver antenna 12, an RF-to-digital front-end 14, the measurement delay buffer 16, a digital correlation processor 18, a data processor 22, and a user-interface 24. The receiver antenna 12 provides output to the RF-to-digital front-end 14, which provides output to the measurement delay buffer 16, which provides output to the digital correlation processor 18. The digital correlation processor 18 communicates with the data processor 22, which communicates with the user-interface 24.

A transmitter 15 includes, from top to bottom, a transmitter antenna 17, a digital-to-RF front-end 19, an encoder 21, and a transmitter processor 23. The transmitter processor 23 communicates with the encoder 21, which provides output to the digital-to-RF front-end 19, which provides output to the transmitter antenna 17. The transmitter antenna 17 transmits an encoded signal 25 that is received by the receiver 13.

In operation, the transmitter processor 23 forwards a digital transmit signal to the encoder 21. The encoder 21 employs a code, such as a Pseudo Noise (PN) sequence or other cryptographic code to encode the digital transmit signal. In the present specific embodiment, the code is a function of time, such that the code will have a predetermined value at any given time. The resulting digital encoded signal is forwarded to the Digital-to-RF front-end 19, where it is frequency-converted as needed, amplified, and converted to an analog Radio Frequency (RF) signal in preparation for transmission via the transmitter antenna 17.

The resulting encoded RF signal is transmitted Over The Air (OTA) via a forward link 25, where it is received by the receiver antenna 12. Those skilled in the art will appreciate that the forward communications link 25 may be another type of link, such as a fiber optic link, without departing from the scope of the present invention. In this case, the antennas 12 and 17 would be omitted or replaced with other suitable components.

The received encoded RF signal is forwarded to the RF-to-Digital front-end 14, where the signal is mixed, amplified, filtered, and downconverted to a digital baseband signal, and so on, as required for a given application. The resulting digital signal is provided to the measurement delay buffer 16, which delays the received signal by a predetermined time interval.

The resulting delayed signal is forwarded to the digital correlation processor 18. In the present embodiment, the digital correlation processor 18 employs a local replica sequence, also called a replica signal, which incorporates the code used by the encoder 21 to encode the original signal. The digital correlation processor 18 generates the replica signal with reference to the current time and with predetermined knowledge of what the replica signal should be as a function of time based on the code employed by the encoder 21 to encode the original signal for transmission. The digital correlation processor 18 tracks the earliest detected signal within the predetermined search window, also called the search time interval or time confidence window, and ignores subsequent signals appearing in the search window.

The digital correlation processor 18 then correlates the received signal with the local replica signal. Correlation between the local replica signal and the received signal occur at specific windows in time, such that specific segments of the received signal are correlated with the replica signal. Each segment of the received signal that is correlated has a length corresponding to the correlation window. The correlation window is then shifted by a predetermined amount, and correlation of a new received signal segment with the local replica signal resumes until a peak is found or the entire search window corresponding to the segment is searched and nothing is found. When a correlation peak is found, this indicates that the desired signal has been detected. Subsequently, the digital correlation processor implements signal lock-on and begins tracking and decoding the received signal via methods known in the art.

Those skilled in the art will appreciate that the search window may be several times longer than the correlation window. The search window represents a predetermined time interval during which the digital correlation processor 18 searches for a desired signal.

In some implementations, the local replica signal may escape from the digital correlation processor 18 or may be extracted therefrom and then retransmitted. In some conventional receiver systems, the generation of the local replica signal and subsequent rebroadcast of the replica signal may increase channel noise and interfere with reception of the signal from the transmitter 15 by the receiver 13.

To overcome potential problems associated with prompt local replica signal generation, the embodiment 10 of the present invention employs the measurement delay buffer 16. In the present embodiment, the measurement delay buffer 16 implements a delay that is approximately greater than or equal to the length of the search window associated with the digital correlation processor 18. Consequently, when the digital correlation processor 18 generates the local replica signal, the local replica signal will be to old to be rebroadcast and inadvertently detected by similar receivers. Hence, the local replica signal would be less likely to interfere with communications if extracted and rebroadcast.

The search window and the local replica signal generated by the digital correlation processor 18 are selectively delayed by an amount corresponding to the delay implemented by the measurement delay buffer 16. Since the local replica signal is based on the code used by the encoder 21 to encode the transmitted signal, which is a function of time, any delay in the time will cause the code to mismatch with the signal that the digital correlation processor 18 is searching for. Consequently, the digital correlation processors of other receivers (not shown) are less likely to detect the rebroadcast signal. If the delay is beyond the length of the search window, a rebroadcast signal will typically not be detected.

For the purposes of the present discussion, the search window refers to the size, in terms of time, of the segment of a received signal that is processed by the correlator 30 before moving to the next predetermined search window. In some applications, the search window corresponds to the correlation window, which corresponds to the size of a correlation register employed to perform correlation calculations. In the present embodiment, the search window represents a predetermined time interval in which the digital correlation processor 18 searches for a received signal before the window is shifted to another time interval.

The delay buffer 16 implements a delay that is sufficiently long to delay the generation of a prompt local replica signal by the digital correlation buffer 16. This delay is designed to prevent jamming or spoofing by signal rebroadcast and to prevent replica signals from the digital correlation processor 18 from contributing to noise, which could corrupt the link 25. By preventing prompt generation of a local replica signal via the measurement delay buffer 16, the risk that the local replica signal will augment system interference or noise is reduced. Furthermore, the use of the replica signal for jamming purposes is thwarted.

The exact width of the search window, which corresponds to the correlation window in some implementations, may be determined by those skilled in the art with access to the present teachings without undue experimentation. The length of the measurement delay buffer 16 may be determined likewise. In a particular example, if the data rate of a receiver is 43.7 million samples per second, and each sample is 1.5 bits long, then a 66 million-bit delay buffer would implement a 1.0-second delay.

Those skilled in the art will appreciate that the digital correlation processor 18 may be replaced with different receiver circuitry and/or processors, such as a convolutional decoder (if the encoder 21 is a convolutional encoder), rake receiver circuitry, or other demodulation circuitry, without departing from the scope of the present invention.

After the digital correlation processor 18 has locked on to the desired signal, the processor 18 begins tracking the signal, which may be forwarded to the data processor 22. The data processor 22 may run various software and/or hardware modules, as discussed more fully below, to facilitate applications processing, such as network synchronization, message demodulation or navigation processing for Global Positioning System (GPS) receivers. The user-interface 24 may include user-interface software, keypads, display screens, and so on (not shown) to enable the user to interact with applications and information available via the data processor 22.

The receiver 13 is particularly useful in spread-spectrum and GPS systems employing cryptographic codes, such as Pseudo Noise (PN) codes. The receiver 13 helps to prevent leakage or extraction of early or prompt extraction of PN codes or other spreading sequences from the receiver 13 by delaying local generation of the codes and by selectively inhibiting user-modifications to the receiver clock as discussed more fully below.

Figure 2:
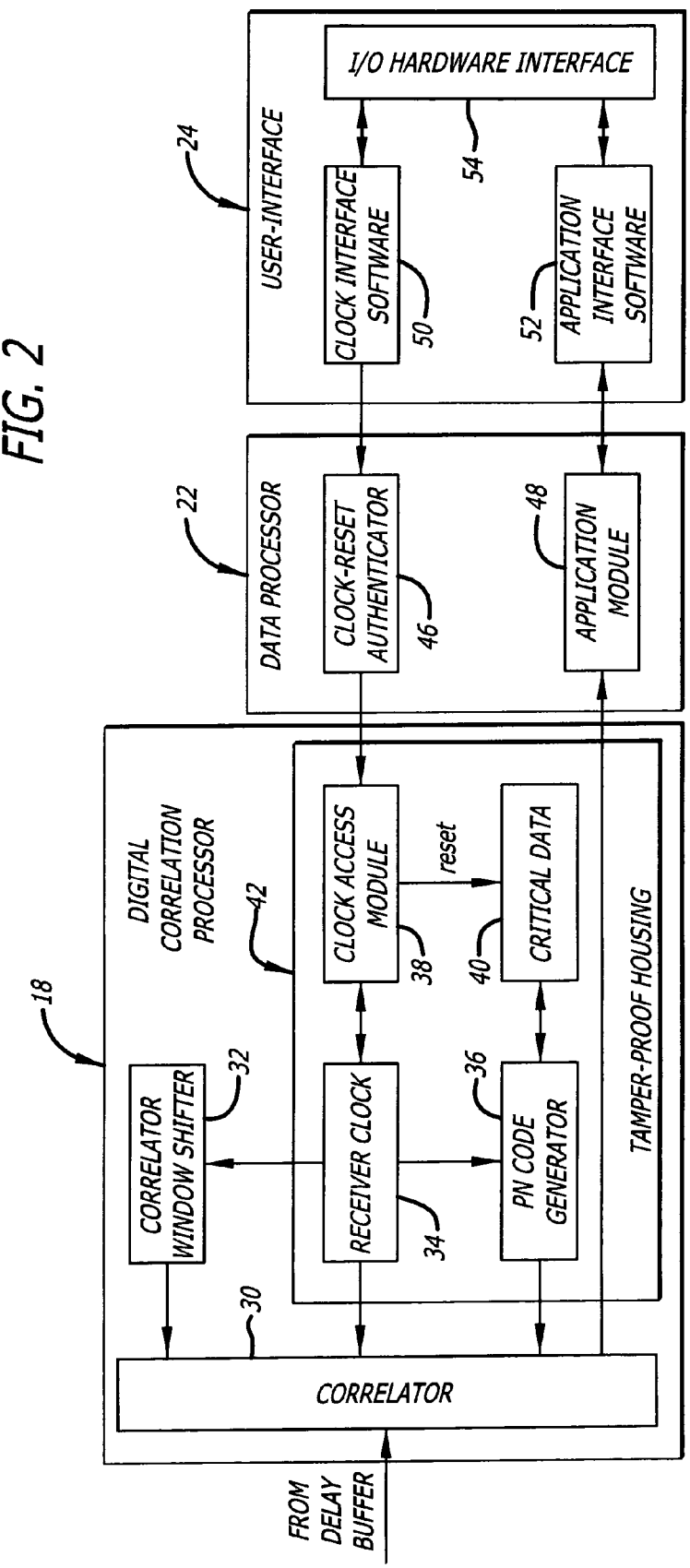
FIG. 2 is a more detailed diagram showing the digital correlation processor, data processor, and user-interface of FIG. 1.

FIG. 2 is a more detailed diagram showing the digital correlation processor 18, data processor 22, and user-interface 24 of FIG. 1. In the present specific embodiment, the digital correlation processor 18 includes a correlator 30, which receives input from a correlator window shifter 32, a receiver clock 34, and a code generator 36, and provides output to an application module 48 running on the data processor 22.

The receiver clock 34 provides output to the code generator 36, the correlator 30, and the correlator window shifter 32, and communicates with a clock-access module 38. The clock-access module 38 selectively provides a reset signal to critical data 40 stored in secure memory. The critical data 40 is accessible by the code generator 36. The clock-access module 38 receives input from a clock-reset authenticator module 46 running on the data processor 22. The receiver clock 34, the clock-access module 38, the code generator 36, and the critical data 40 are enclosed within a tamper-resistant enclosure 42. Some applications may also require the measurement delay buffer 16 to be contained within a tamper resistant enclosure to prevent circumvention of the delay. The construction of suitable tamper-proof housings is known in the art. Significant in this implementation is that there is no need for the correlator circuitry 18 to be so protected.

The clock-reset authenticator 46 receives input from clock interface software 50 of the user-interface 24. The application module 48 of the data processor 22, which receives input from the correlator 30, communicates with application interface software 52 of the user-interface 24. The application interface software 52 and the clock interface software 50 communicate with an input/output hardware interface 54 of the user-interface 24.

In operation, the digital delayed signal output from the measurement delay buffer 16 passes into the correlator 30, which may be implemented via a receiver chip and accompanying acquisition logic known in the art. The correlator 30 correlates the received signal with a local replica signal generated by the code generator 36 with reference to critical data 40. The local replica signal has predetermined values at specific times. The code generator 36 references the receiver clock 34 to construct an accurate replica signal, ensuring that the replica signal has correct values at correct times.

The correlator window shifter 32 moves the correlation window of the correlator 30 so that the correlator begins correlating at search windows that are offset by the delay of the measurement delay buffer 16 of FIG. 1. Generation of the local replica signal by the code generator 36 is also correspondingly delayed. The code generator 36 includes a built-in delay corresponding to the delay of the measurement delay buffer 16. Alternatively, the code generator 36 also receives a shift input (not shown) from the correlator window shifter 32.

To prevent unauthorized access to the receiver clock 34 by those wishing to adjust the time of the receiver clock so as to cancel the effect of the delay implemented by the measurement delay buffer 16 of FIG. 1 on the generation of the local replica signal by the code generator 36, any adjustments to the time of the receiver clock 34 are authenticated via the clock-access module 38 and the clock-reset authenticator 46. Those skilled in the art will appreciate mechanisms for setting of the receiver clock 34 may be limited to time-setting satellite signals or other authenticated signals received through the correlator 30. Certain signals received from the correlator 30 may contain timing information, which may be used to accurately set the receiver clock 34. Additional software and/or hardware (not shown) may be included in the receiver clock module 34 to facilitate setting the time of the receiver clock 34. The clock-access module 38 runs algorithms to selectively set the receiver clock 34 and/or the critical data 40 in response to input from the clock-reset authenticator 46 of the data processor 22 as discussed more fully below. Those skilled in the art will know which components to implement and how to implement them to facilitate setting the receiver clock 34 to meet the needs of a given application.

In the present embodiment, if a user wishes to set the receiver clock 34 via the I/O hardware interface 54, the clock interface software 50 is activated thereby. The clock interface software 50 interfaces with the clock-reset authenticator 46, which implements various steps, such as username and password verification, to verify that the user of the I/O hardware interface 54 is authorized to make adjustments to the receiver clock 34. If the user is authorized to set the receiver clock 34 as determined via algorithms running on the clock-reset authenticator 46, the clock-reset authenticator 46 allows the authorized user to set the receiver clock 34, but the clock-access module 38 then erases the critical data 40. Consequently, if the time of the receiver clock 34 is adjusted via the user-interface 24, the critical data 40 must be reloaded before an accurate local replica signal can be generated by the code generator 36. This adds an additional layer of authentication. Those skilled in the art will appreciate that automatic resetting of the critical data 40 may be avoided or that other authentication methods employed by the clock-reset authenticator 46 may be avoided, without departing from the scope of the present invention. Resetting of the critical data 40 may provide sufficient authentication, since operation of the PN code generator 18 requires reloading of the critical data 10. Verification of user names and passwords only by the clock-reset authenticator 46 may provide sufficiently robust authentication for some applications.

The received digital signal is detected by correlating the replica code output by the code generator 36 with the received signal input to the correlator 30 and continuing to shift the correlation window and search window in time until a correlation peak is found. Upon finding the correlation peak, the received signal is locked-on, demodulated, and forwarded to the application module 48 running on the data processor 22. The application module 48 may run various programs to facilitate communications, navigation, and so on.

In GPS applications, the delay implemented via the measurement delay buffer 16 of FIG. 1, will result in a corresponding delay in the position reporting through the application interface software 52. Hence, the position of the user will be the position of the user one second previously if a one-second delay is implemented via the measurement delay buffer 16 of FIG. 1.

If a user wishes to change the time displayed via the user-interface 24, changing the time output by the receiver clock 34 is not necessary. Time information received by the application module 48 from the correlator 30 via the receiver clock 34 may be altered as needed by software running on the application module 48 prior to display via the user-interface 24. Hence, instead of adjusting the receiver clock time itself, which is used for signal detecting and lock-on purposes, time information retrieved from the receiver clock 34 may be modified for display purposes.

Those skilled in the art will appreciate that various components shown in FIG. 2 may be omitted or replaced with other components without departing from the scope of the present invention. For example, the tamper-proof housing 42 may be omitted. The correlator window shifter 32 may be built into the correlator 30. The code generator 36, which generates a replica signal, may be replaced with another receiver component. The entire digital correlation processor 18 may be replaced with other receiver circuitry, such as rake receivers, convolutional decoders, etc.

By employing the measurement delay buffer 16 of FIG. 1 to sufficiently delay decoding of the received signal, processes used to decode the received signal are sufficiently delayed to prevent timely rebroadcast of a replica signal, which could interfere with overall system communications. Consequently, communications system mis-correlation is inhibited, and a potential source for system interference is eliminated.

FIG. 3 is a flow diagram of a method 60 adapted for use with the communications system 10 of FIG. 1. With reference to FIGS. 1-3, in an initial receiving step 62, the receiver antenna 12 receives a signal that has been encrypted via a predetermined code, such a cryptographic code, which is a function of time. In a subsequent delaying step 64, the received encrypted signal is delayed by an amount sufficient to prevent jamming or spoofing by signal rebroadcast. For most applications, a delay that is approximately greater than or equal the search window employed by the correlator 30 is sufficient to thwart acquisition of the extracted signal and/or reduce or eliminate other types of signal interference that could be generated through rebroadcast of a local replica signal. The construction of correlators with specific correlation windows and search windows is well known in the art.

Subsequently, control is passed to a correlating step 66. In the correlating step, the digital correlation processor 18 of FIG. 2 employs a search window to correlate the delayed signal with a correspondingly delayed replica signal. The delayed replica signal is based on the predetermined code characteristic of the received encrypted signal. In the present embodiment, the predetermined code is a function of time.

If the desired signal is detected as indicted by a correlation peak in the correlating step 66, then signal lock-on is attempted. If signal lock-on is achieved as determined in a lock-on step 68, then tracking of the delayed received signal proceeds in a tracking step 70. Otherwise, the correlation window is shifted by a predetermined amount of time in a shifting step 72, and correlation proceeds, as control is passed back to the correlating step 66.

When the received signal is being tracked in the tracking step 70, if the receiver 13 is turned off, or signal tracking is otherwise aborted, such as via commands input via the user-interface 24, then the method 60 ends. If the signal is inadvertently lost, control returns to the initial receiving step 62.

If at any time during tracking, clock adjustment information and/or adjustment commands are received by the receiver clock 34 via the received signal or via an algorithm (not shown) running on the receiver 13 that generates clock-adjustment commands in response to signals received from the transmitter 15, then control is passed to a clock-adjusting step 80. In the clock-adjusting step 80, the time of the receiver clock 34 is adjusted or corrected in accordance with the received clock-adjustment commands.

If clock-adjustment commands are received by the receiver clock 34 via the clock-access module 38, then the critical data is erased in step 78 before clock adjustments are made in the clock-adjusting step 80. In addition, if the clock-access module 42 detects low battery voltage or other improper operating conditions, the deletion step 78 is implemented, and the critical data is deleted.

After clock adjustments are made, the signal that was-being tracked may be lost as determined via a signal-checking step 74. If the signal is lost, control is passed back to the initial receiving step 62. Otherwise, the receiver 13 continues tracking the received signal. However, before successful signal tracking can be achieved after deletion of the critical data, the critical data must be reloaded.

Critical data reloading mechanisms (not shown) may be implemented by those skilled in the art without undue experimentation. For example, the user-interface 24 may facilitate writing new data to the secure memory housing the critical data 40.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for securing signals in a communications system comprising:
   first means for incorporating a code within a signal;
   second means for employing said code to decode said signal; and
   third means for selectively preventing detection by said second means of a subsequent signal employing said code.

2. The system of claim 1 wherein said third means includes a predetermined delay after receipt of said signal by said second means, said predetermined delay sufficient to prevent detection by said second means of said subsequent signal employing said code, and wherein said code is a function of a time value associated with said signal, and wherein said subsequent signal incorporating said code lacks a corresponding accurate time value due to said predetermined delay, thereby disabling detection of said subsequent signal via said second means.

3. The system of claim 2 wherein said second means includes a receiver having a delay buffer, said delay buffer sufficient to add said predetermined delay to said signal before detection by said second means.

4. The system of claim 3 wherein said receiver has a correlator that employs said code to detect said signal.

5. The system of claim 4 wherein said predetermined delay is longer than a search window employed by said correlator.

6. The system of claim 4 wherein said receiver incorporates a clock whose time is selectively adjustable via a received signal and not user-adjustable via said receiver.

7. The system of claim 6 wherein said receiver includes means for receiving a time value from said clock, adding a user-adjustable modification thereto, and outputting an adjusted time value in response thereto.

8. The system of claim 7 wherein said receiver incorporates a clock whose time is selectively adjustable via a received authenticated signal and user-adjustable only if said code is reset or erased.

9. An efficient receiver comprising:
   first means for receiving an encoded signal;
   second means for detecting and decoding said encoded signal via a replica of a code or inverse thereof employed to encode said encoded signal, said second means characterized by a search window; and
   third means for selectively delaying said encoded signal beyond said search window prior to decoding by said second means.

10. A spread spectrum communication system having reduced noise comprising:
    first means for encoding a signal via a predetermined code and transmitting a corresponding encoded signal;
    second means for receiving said encoded signal said second means including a receiver that employs a replica of said predetermined code and a search window to detect said encoded signal; and
    third means for selectively delaying said encoded signal beyond said correlation window.

11. A method for preventing spoofing of a signal comprising the steps of:
    incorporating a cryptographic code within said signal, said cryptographic code a function of a time value associated with said signal and
    employing said cryptographic code to detect said signal after a predetermined delay after receipt of said signal via a second means, said predetermine delay sufficient to prevent detection by said second means of a subsequent signal employing said cryptographic code.

* * * * *